(12) United States Patent
Wada et al.

(10) Patent No.: US 6,411,495 B2
(45) Date of Patent: Jun. 25, 2002

(54) LAMINATED CERAMIC CAPACITOR

(75) Inventors: Nobuyuki Wada, Shiga-ken; Jun Ikeda, Omihachiman; Takashi Hiramatsu, Shiga-ken; Yukio Hamaji, Otsu, all of (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

(21) Appl. No.: 09/776,402

(22) Filed: Feb. 2, 2001

Related U.S. Application Data

(62) Division of application No. 09/251,663, filed on Feb. 17, 1999, now Pat. No. 6,225,250.

(30) Foreign Application Priority Data

Feb. 17, 1998 (JP) .............................................. 10-35171
Feb. 17, 1998 (JP) .............................................. 10-35172
Aug. 20, 1998 (JP) ......................................... 10-233806
Aug. 20, 1998 (JP) ......................................... 10-233807

(51) Int. Cl.[7] ........................ H01G 4/10; C04B 35/468
(52) U.S. Cl. ................... 361/321.4; 361/321.5; 501/137; 501/138; 501/139; 264/615
(58) Field of Search ................... 501/137, 138, 501/139; 361/321.4, 321.5; 264/615

(56) References Cited

U.S. PATENT DOCUMENTS

| 5,248,640 A | * | 9/1993 | Sano et al. ................... 501/137 |
| 5,268,342 A | * | 12/1993 | Nishiyama et al. .......... 501/138 |
| 5,510,305 A | * | 4/1996 | Sano et al. ................... 501/138 |
| 5,635,436 A | * | 6/1997 | Fukuda et al. ............... 501/138 |

* cited by examiner

Primary Examiner—Karl Group
(74) Attorney, Agent, or Firm—Dickstein, Shapiro, Morin & Oshinsky, LLP.

(57) ABSTRACT

The present invention provides a dielectric ceramic composition whose electrostatic capacity has an excellently low temperature dependence; which can be fired in a reducing atmosphere; and which is advantageously used in a laminated ceramic capacitor having an internal electrode formed of a base metal such as nickel or nickel alloy. The dielectric ceramic composition is represented by the following formula: $\{Ba_{1-x}Ca_xO\}_m TiO_2 + \alpha MgO + \beta MnO$, wherein $0.001 \leq \alpha \leq 0.05$; $0.001 \leq \beta \leq 0.025$; $1.000 < m \leq 1.035$; and $0.02 \leq x \leq 0.15$.

18 Claims, 1 Drawing Sheet

LAMINATED CERAMIC CAPACITOR

This is a division of application Ser. No. 09/251,663, filed Feb. 17, 1999.

BACKGROUND OF THE INVENTION

1. Field of the Invention

The present invention relates to a dielectric ceramic composition which is advantageously used in a laminated ceramic capacitor having an internal electrode formed of a base metal such as nickel or nickel alloy. The present invention also relates to a laminated ceramic capacitor which is formed from the dielectric ceramic composition and to a method for producing the capacitor.

2. Description of the Related Art

A laminated ceramic capacitor includes a laminate formed of a plurality of laminated dielectric ceramic layers and an internal electrode laminated therein. Recently, the internal electrode has been formed of an inexpensive base metal such as Ni rather than an expensive noble metal such as Ag or Pd in order to reduce cost.

When the internal electrode is formed of a base metal such as Ni, the electrode must be fired in a reducing atmosphere so as to avoid oxidizing the base metal. However, when fired in a reducing atmosphere, a ceramic formed of barium titanate is disadvantageously reduced to become semiconductive.

In order to solve this problem, there has been developed a technique for preventing reduction of dielectric materials by modifying the ratio of the barium sites/titanium sites in the barium titanate solid solution such that it exceeds the stoichiometric ratio (Japanese Patent Publication (kokoku) No. 57-42588). Through this technique, a laminated ceramic capacitor having an internal electrode formed of a base metal such as Ni can be put into practical use, and production of such capacitors has increased.

With recent advances in development of electronics, miniaturization of laminated ceramic electronic elements has progressed rapidly. In the field of laminated ceramic capacitors, trends towards miniaturization and increased capacitance are also noticeable. In addition, laminated capacitors must have an electrostatic capacity that is higher and have a lower dependence on temperature. Thus, a variety of materials having high dielectric constant and excellent temperature-related characteristics have been proposed and put into practical use.

Thus far, all the proposed materials comprise $BaTiO_3$ as a primary component and a rare earth element, which is diffused into $BaTiO_3$ grains during sintering, as an additive. Grains that constitute the obtained sintered compacts are known to have a core-shell structure comprising a core portion containing no diffused additive component and a shell portion containing the diffused additive component. Therefore, the combination of the core portion and the shell portion—which differ according to the temperature dependence of the dielectric constant—provides a composition whose dielectric constant has a low dependence on temperature.

These materials realize laminated ceramic capacitors having high electrostatic capacity and low dependence on temperature, and thus have greatly contributed toward broadening of the market.

However, the core-shell structure, which is attained through sintering of ceramics and control of diffusion of the additive component, also involves a disadvantage. Specifically, as sintering progresses the additive component diffuses excessively to fail to provide low dependence on temperature, whereas insufficient sintering results in poor reliability. Achieving control of sintering and diffusion is relatively difficult with the above-described materials, causing undesirable variation in the temperature dependence of dielectric constant.

Furthermore, in order to satisfy demand for miniaturization and high electrostatic capacity, dielectric ceramic layers formed in a laminated compact must be made thinner and the laminates must comprise a greater number of layers. However, when the ceramic layers become thin, a smaller number of ceramic grains are included between internal electrodes and this remarkably deteriorates the reliability of the capacitor. Thus, the decrease in the thickness must be limited. Therefore, development of materials having high reliability and exhibiting low variation in dielectric constant with temperature and electric field must be achieved through a decrease in the size of ceramic grains.

Meanwhile, many electronic elements such as those used in automobiles are used in a high-temperature environment, and therefore those whose characteristics remain stable at high temperature are desired. Specifically, there is desired a laminated ceramic capacitor of high reliability and having a dielectric constant having a low temperature dependence at higher temperature (e.g., 150° C.).

However, the sinterability of conventional materials having a core-shell structure and diffusion of an additive component increases as the $BaTiO_3$ grains become smaller, which causes difficulty in maintaining low temperature dependence characteristics. Since $BaTiO_3$ exhibits a large variation in dielectric constant at high temperature (e.g., 150° C.), maintaining a dielectric constant having low temperature dependence up to high temperature is relatively difficult.

As described hereinabove, according to the state of the art, realization of a sufficiently thin laminated ceramic capacitor and a dielectric constant of sufficiently low temperature dependence by use of a material having a core-shell structure is difficult.

SUMMARY OF THE INVENTION

In view of the foregoing, an object of the present invention is to provide a dielectric ceramic composition to solve the above-described problems. Another object of the invention is to provide a laminated ceramic capacitor produced from the composition. Still another object of the invention is to provide a method for producing the ceramic laminated capacitor.

In short, the dielectric ceramic composition according to the present invention is a material that does not have a core-shell structure formed through diffusion of an additive component, i.e., a material whose temperature-dependent characteristics and reliability do not depend on diffusion of an additive component. A laminated ceramic capacitor produced from the dielectric ceramic according to the present invention satisfies the B characteristics specified by JIS specifications and satisfies the X7R and X8R characteristics specified by EIA specifications.

In one aspect of the present invention, there is provided a dielectric ceramic composition comprising a complex oxide containing Ba, Ca, Ti, Mg and Mn as metal elements.

In another aspect of the present invention, there is provided a dielectric ceramic composition represented by the following formula: $\{Ba_{1-x}Ca_xO\}_m TiO_2 + \alpha MgO + \beta MnO$ wherein $0.001 \leq \alpha \leq 0.05$; $0.001 \leq \beta \leq 0.025$; $1.000 < m \leq 1.035$; and $0.02 \leq x \leq 0.15$.

Preferably, the dielectric ceramic composition according to the present invention further contains a sintering aid in an amount of about 0.2–5.0 parts by weight based on 100 parts by weight of the remaining components of the dielectric ceramic composition. Preferably, the sintering aid comprises $SiO_2$ as its primary component.

In another aspect of the present invention, there is provided a laminated ceramic capacitor which is formed of a dielectric ceramic composition comprising a complex oxide containing Ba, Ca, Ti, Mg and Mn as metal elements.

More specifically, the laminated ceramic capacitor includes a laminate formed of a plurality of dielectric ceramic layers and further includes a plurality of external electrodes provided at different positions on side faces of the laminate, wherein each of a plurality of internal electrodes are formed along an interface between two adjacent dielectric ceramic layers such that each of the internal electrodes has one end exposed to one of the side faces so as to establish electric contact with one of the external electrodes. The dielectric ceramic layers are formed of the above-described dielectric ceramic composition. The internal electrodes of the laminate ceramic capacitor preferably contain Ni or an Ni alloy.

In yet another aspect of the present invention, there is provided a method for producing a laminated ceramic capacitor comprising the following steps:

a step for preparing a mixture comprising a compound represented by $\{Ba_{1-x}Ca_xO\}TiO_2$, an Mg compound, and an Mn compound;

a step for fabricating a laminate by laminating a plurality of ceramic green sheets containing the mixture and a plurality of internal electrodes each formed along an interface between two adjacent ceramic green sheets such that each of the internal electrodes has one end exposed to one of the side faces;

a step for firing the laminate; and a step for forming a plurality of external electrodes on each side face of the laminate such that the one end of each of the internal electrodes exposed to the side face is electrically contacted with one of the external electrodes.

Preferably, in the method for producing a laminated ceramic capacitor, the content of an alkali metal oxide present as an impurity in the compound represented by $\{Ba_{1-x}Ca_xO\}TiO_2$ is about 0.03 wt. % or less.

Preferably, the compound represented by $\{Ba_{1-x}Ca_xO\}TiO_2$ has an average particle size of about 0.1–0.8 μm.

The average particle size of the compound represented by $\{Ba_{1-x}Ca_xO\}TiO_2$ may be about 0.1 μm –0.3 μm, or may be more than 0.3 μm but not more than about 0.8 μm. More preferably, the maximum particle size of the compound is about 0.5 μm or less for the former case and is about 1.0 μm or less for the latter case.

In the method for producing a ceramic capacitor according to the present invention, the ratio of (average grain size of dielectric ceramic product)/(average particle size of provided starting material powder), which is represented by R, is preferably about 0.90–1.2.

In the above-described aspects of the present invention which relate to the compositions and method for producing a laminated ceramic capacitor, the dielectric ceramic compositions may further contain a rare earth element, which is represented by RE. RE is preferably selected from the group consisting of Y, Gd, Tb, Dy, Ho, Er and Yb.

BRIEF DESCRIPTION OF THE DRAWING

Various other objects, features, and many of the attendant advantages of the present invention will be readily appreciated as the same becomes better understood with reference to the following detailed description of the preferred embodiments when considered in connection with an accompanying drawing in which.

BEST MODE FOR CARRYING OUT THE INVENTION

Figure 1:
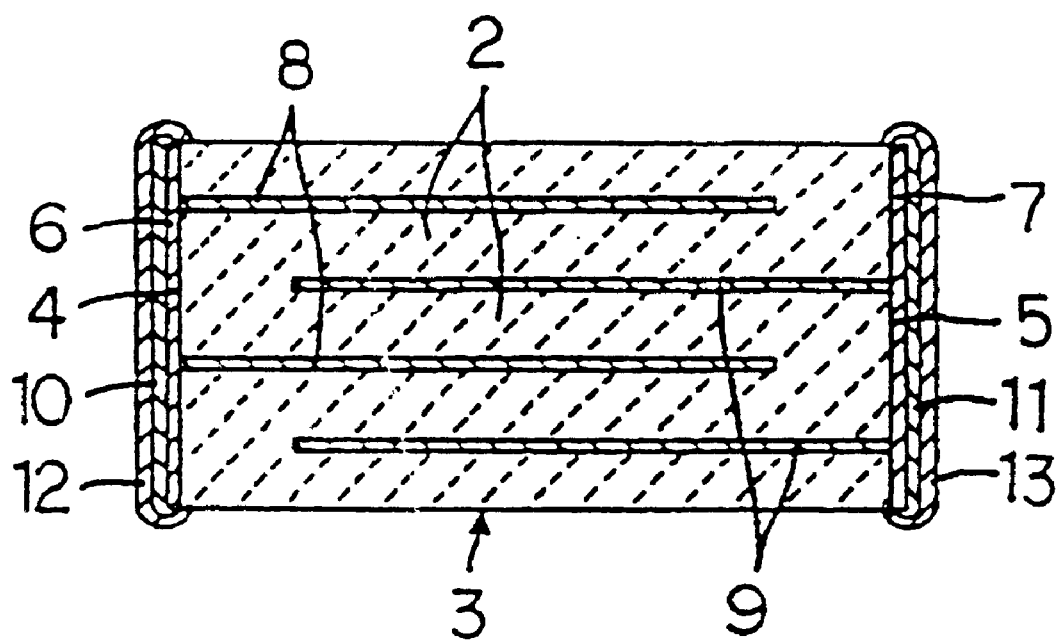
FIG. 1 is a cross-sectional view of a laminated ceramic capacitor 1 according to one mode for carrying out the present invention.

As mentioned above, the dielectric ceramic composition according to the present invention comprises a complex oxide containing Ba, Ca, Ti, Mg and Mn as metal elements. More specifically, the dielectric ceramic composition according to the present invention is represented by the following formula:

$$\{Ba_{1-x}Ca_xO\}_m TiO_2 + \alpha MgO + \beta MnO$$

wherein $0.001 \leq \alpha \leq 0.05$; $0.001 \leq \beta \leq 0.025$; $1.000 < m \leq 1.035$; and $0.02 \leq x \leq 0.15$.

Such a ceramic can be fired without becoming semiconductive, even when fired in a reducing atmosphere. From the dielectric ceramic, there can be obtained a laminated ceramic capacitor that satisfies the B characteristics specified by JIS specifications within the range of –25° C. to +85° C. and variation in electrostatic capacity of –10% to +10% that satisfies the X7R characteristics within the range of –55° C. to +125° C. and variation in electrostatic capacity of ±15%, and that satisfies the X8R characteristics specified by EIA specifications within the range of –55° C. to +155° C. and variation in electrostatic capacity of ±15%. Moreover, the capacitors have high reliability and high breakdown voltage at both room temperature and high temperature.

The dielectric ceramic composition according to the present invention typically contains a sintering aid, which is incorporated in an amount of about 0.2–5.0 parts by weight based on 100 parts by weight of the remaining components of the dielectric ceramic composition. Preferably, the sintering aid predominantly comprises $SiO_2$.

The above-described dielectric ceramic composition is used, for example, to producing a laminated ceramic capacitor 1 illustrated in FIG. 1.

As shown in FIG. 1, the laminated ceramic capacitor 1 comprises a laminate 3 containing a plurality of laminated dielectric layers 2 and a first external electrode 6 and a second external electrode 7 which are provided on a first side face 4 and a second side face 5 of the laminate 3, respectively. In its entirety, the laminated ceramic capacitor 1 constitutes a rectangular parallelepiped-shaped chip-type electronic element.

In the laminate 3, first internal electrodes 8 and second electrodes 9 are disposed alternately. The first internal electrodes 8 are formed along specific interfaces between dielectric ceramic layers 2 such that each of the internal electrodes 8 has one end exposed to the first side face 4 so as to be electrically connected to the first external electrode 6, whereas second internal electrodes 9 are formed along specific interfaces between dielectric ceramic layers 2 such that each of the internal electrodes 9 has one end exposed to the second side face 5 so as to be electrically connected to the second external electrode 7.

In the laminated ceramic capacitor 1, the dielectric ceramic layers 2 included in the laminate 3 are produced from the above-mentioned dielectric ceramic composition.

The laminated ceramic capacitor 1 is produced according to the following steps:

In a first step, a mixture comprising a compound represented by $\{Ba_{1-x}Ca_xO\}TiO_2$, an Mg compound and an Mn compound is prepared through mixing, such as wet-mixing. Mixing ratios of the compounds are preferably selected so as to obtain a dielectric ceramic composition represented by $\{Ba_{1-x}Ca_xO\}_mTiO_2+\alpha MgO+\beta MnO$ wherein $0.001 \leq \alpha \leq 0.05$; $0.001 \leq \beta \leq 0.025$; $1.000 < m \leq 1.035$; and $0.02 \leq x \leq 0.15$.

The average particle size of the compound represented by $\{Ba_{1-x}Ca_xO\}TiO_2$ is preferably about 0.1 μm–0.8 μm. When the average particle size is 0.1 μm–0.3 μm (in this case, the maximum particle size is preferably 0.5 μm or less), the laminated ceramic capacitor 1 can possess a dielectric constant having low temperature dependence up to 125° C. and high reliability, even when the dielectric ceramic layer 2 has a thickness as thin as 3 μm or less. When the average particle size is at least 0.3 μm and not more than 0.8 μm (in this case, the maximum particle size is preferably 1.0 μm or less), the laminated ceramic capacitor 1, having a dielectric ceramic layer 2 with a thickness of more than 3 μm, can possess a dielectric constant having low temperature dependence up to 150° C.

Usually, the above-described compound represented by $\{Ba_{1-x}Ca_xO\}TiO_2$ contains alkali metal oxide as an impurity. The present inventors have confirmed that the content of the alkali metal oxide greatly influences electric characteristics of the dielectric ceramic composition. Specifically, they have confirmed that the content of the alkali metal oxide must be regulated to about 0.03 wt. % or less, preferably about 0.02 wt. % or less, in order to obtain a dielectric ceramic having high reliability.

To the above-described mixture, a sintering aid, e.g., one predominantly comprising $SiO_2$, is incorporated in an amount of about 0.2–5.0 parts by weight based on 100 parts by weight of the raw starting composition for forming the dielectric ceramic composition. By addition of such a sintering aid, the dielectric ceramic can be sintered at a relatively low temperature, such as 1250° C. or less, during the below-described firing step.

Then, an organic binder and a solvent are added to the mixed powder, to thereby obtain a slurry, and a ceramic green sheet forming the dielectric ceramic layer 2 is produced from the slurry.

Subsequently, electrically conductive paste films forming internal electrodes 8 and 9 are formed on the predetermined ceramic green sheets. The conductive paste film contains a base metal such as nickel or copper, or an alloy thereof, and is formed through a method such as screen printing, vapor deposition, or plating.

A plurality of ceramic green sheets, including those on which conductive paste film has been formed as described above, are laminated, pressed, and then cut, if necessary. Thus, there is produced a green laminate 3 in which ceramic green sheets and the internal electrodes 8 and 9 formed along specific interfaces between ceramic green sheets are laminated, such that each of the internal electrodes 8 has one end exposed to the side face 4 and each of the internal electrodes 9 has one end exposed to the side face 5.

The laminate 3 is then fired in a reducing atmosphere. As described above, since a sintering aid comprising $SiO_2$ is added to the mixture, the dielectric ceramic can be sintered at a relatively low temperature, such as 1250° C. or less, to thereby minimize shrinkage of internal electrodes 8 and 9 during the firing step. Therefore, the reliability of the laminated ceramic capacitor 1 having a thin dielectric ceramic layer 2 can be enhanced. As described above, materials containing a base metal such as nickel, copper, or an alloy thereof there can be employed as the internal electrodes 8 and 9 without any problem.

During sintering to obtain the dielectric ceramic, the ratio of (average grain size of dielectric ceramic product)/(average particle size of provided starting material powder), which is represented by R, is preferably about 0.90–1.2. The range of the ratio is such that considerable grain growth does not occur during sintering of the ceramic. When the ratio falls within the above-described range, there can be obtained a dielectric ceramic having a dielectric constant of low temperature dependence.

The first external electrode 6 is formed on the first side face 4 of the laminate 3 so as to be in contact with the exposed ends of the first internal electrodes 8, and the second external electrode 7 is formed on the second side face 5 of the laminate 3 so as to be in contact with the exposed ends of the second internal electrodes 9 in the fired laminate 3.

No particular limitation is imposed on the materials for producing the external electrodes 6 and 7. Specifically, the same materials used for producing the internal electrodes 8 and 9 may be used. The external electrodes may also be constructed of a sintered layer comprising electrically conductive metal powder such as powder of Ag, Pd, Ag—Pd, Cu or a Cu alloy; or a sintered layer comprising the above conductive metal powder blended with glass frit such as $B_2O_3$—$Li_2O$—$SiO_2$—$BaO$, $B_2O_3$—$SiO_2$—$BaO$, $Li_2O$—$SiO_2$—$BaO$ or $B_2O_3$—$SiO_2$—$ZnO$. The materials for producing the external electrodes 6 and 7 are appropriately determined in consideration of factors relating to the laminated ceramic capacitor 1 such as use or environment of use.

As described above, the external electrodes 6 and 7 may be formed by applying the metal powder paste forming them on the fired laminate 3 and burning. Alternatively, the electrodes may be formed by applying the paste on the unfired laminate 3 and burning simultaneous with firing of the laminate 3.

The external electrodes 6 and 7 may be coated with plating layers 10 and 11, respectively, formed of Ni, Cu, Ni—Cu alloy, etc., in accordance with need. The plating layers 10 and 11 may further be coated with second plating layers 12 and 13, respectively, formed of solder, tin, etc.

In the above-described dielectric ceramic compositions and method for producing a laminated ceramic capacitor, the dielectric ceramic compositions may further contain a rare earth element, which is represented by RE. RE is preferably selected from the group consisting of Y, Gd, Tb, Dy, Ho, Er and Yb.

EXAMPLES

The present invention will next be described in detail by way of examples, which should not be construed as limiting the invention.

Example 1

The laminated ceramic capacitor produced in the present Example is a laminated ceramic capacitor 1 having a structure shown in FIG. 1.

High-purity $TiO_2$, $BaCO_3$, and $CaCO_3$ serving as starting materials were weighed in amounts such that the produced mixtures had respective Ca contents shown in the following Table 1, then were mixed and crushed. Each of the resultant powders was dried and heated to 1000° C. or more, to thereby synthesize (Ba, Ca)$TiO_3$ having respective average particle sizes shown in Table 1.

TABLE 1

| Type of BaTiO$_3$ | Alkali metal oxide (wt. %) | CaO (mol fraction) | Average particle size ($\mu$m) |
|---|---|---|---|
| A | 0.003 | 0.004 | 0.25 |
| B | 0.010 | 0.100 | 0.25 |
| C | 0.012 | 0.150 | 0.25 |
| D | 0.015 | 0.170 | 0.25 |
| E | 0.062 | 0.100 | 0.25 |
| F | 0.003 | 0.100 | 0.15 |
| G | 0.020 | 0.050 | 0.25 |
| H | 0.010 | 0.100 | 0.40 |
| I | 0.010 | 0.100 | 0.09 |
| J | 0.010 | 0.020 | 0.25 |

In order to obtain an oxide powder which serves as a sintering aid predominantly comprising SiO2, component oxides or carbonates and hydroxides thereof were weighed such that the produced mixtures attained respective molar compositional ratios shown in the following Table 2, and were then mixed and crushed. Each sample of the resultant powders was heated to 1500° C. in a platinum crucible, quenched, and crushed, to thereby obtain average particle sizes of 1 $\mu$m or less.

TABLE 2

| Type of sintering aid | Composition of sintering aid (wt. %) | | | |
|---|---|---|---|---|
| | SiO$_2$ | TiO$_2$ | BaO | CaO |
| a | 100 | 0 | 0 | 0 |
| b | 80 | 15 | 5 | 0 |
| c | 50 | 30 | 0 | 20 |

BaCO$_3$, MgO, and MnO were employed so as to adjust the molar ratio of (Ba, Ca)/Ti in (Ba, Ca)TiO$_3$ represented by m.

Subsequently, respective sintering aids were added to each of the starting material powders, to thereby obtain mixtures having compositions shown in Table 3. To each mixture, a polyvinyl butyral binder and organic solvent such as ethanol were added, and the ingredients were wet-milled in a ball mill so as to prepare a ceramic slurry. The resultant slurry was molded into a sheet by the doctor blade method to thereby obtain a rectangular green sheet having a thickness of 2.7 $\mu$m. Then, a conductive paste containing Ni as a primary component was applied on the resultant ceramic green sheet by way of printing to form conductive paste film for forming internal electrodes.

TABLE 3

| Sample No. | Type of BaTiO$_3$ | {Ba$_{1-x}$Ca$_x$O}$_m$TiO$_2$ + $\alpha$MgO + $\beta$MnO | | | | Sintering aid | |
|---|---|---|---|---|---|---|---|
| | | x | m | $\alpha$ | $\beta$ | Type | Parts by weight |
| 1* | A | 0.004 | 1.01 | 0.02 | 0.005 | a | 1 |
| 2* | D | 0.17 | 1.01 | 0.02 | 0.005 | a | 1 |
| 3* | B | 0.1 | 1.01 | 0.0008 | 0.005 | a | 1 |
| 4* | B | 0.1 | 1.01 | 0.06 | 0.005 | a | 1 |
| 5* | B | 0.1 | 1.01 | 0.02 | 0.0008 | a | 1 |
| 6* | B | 0.1 | 1.01 | 0.02 | 0.028 | a | 1 |
| 7* | B | 0.1 | 0.995 | 0.02 | 0.005 | a | 1 |
| 8* | B | 0.1 | 1 | 0.02 | 0.005 | a | 1 |
| 9* | B | 0.1 | 1.036 | 0.02 | 0.005 | a | 1 |
| 10* | B | 0.1 | 1.01 | 0.02 | 0.005 | a | 0 |
| 11* | B | 0.1 | 1.01 | 0.02 | 0.005 | a | 5.5 |
| 12* | E | 0.1 | 1.01 | 0.02 | 0.005 | a | 1 |
| 13 | B | 0.1 | 1.01 | 0.005 | 0.005 | a | 1 |
| 14 | B | 0.1 | 1.01 | 0.02 | 0.005 | a | 1 |
| 15 | H | 0.1 | 1.01 | 0.02 | 0.005 | a | 2 |
| 16 | I | 0.1 | 1.01 | 0.02 | 0.005 | a | 1 |
| 17 | B | 0.1 | 1.01 | 0.02 | 0.005 | b | 1 |
| 18 | B | 0.1 | 1.005 | 0.02 | 0.002 | a | 1 |
| 19 | B | 0.1 | 1.025 | 0.02 | 0.005 | b | 4 |
| 20 | C | 0.15 | 1.01 | 0.01 | 0.002 | a | 1 |
| 21 | J | 0.02 | 1.01 | 0.01 | 0.005 | a | 1 |
| 22 | F | 0.1 | 1.015 | 0.05 | 0.02 | a | 3 |
| 23 | G | 0.05 | 1.01 | 0.02 | 0.005 | a | 1 |

Subsequently, a plurality of the thus-obtained ceramic green sheets were laminated such that leading ends of the above-mentioned conductive paste films on the sheets were arranged alternately, to thereby obtain a laminate. The resultant laminate was heated at 350° C. in an atmosphere of N$_2$, so as to burn the binder, and then fired for two hours at a temperature shown in Table 4 in a reducing atmosphere of H$_2$—N$_2$—H$_2$O gas containing oxygen at a partial pressure of 10$^{-9}$ to 10$^{-12}$ MPa.

A silver paste containing B$_2$O$_3$—Li$_2$O—SiO$_2$—BaO glass frit was applied to the opposite side faces of the fired laminate, followed by burning in a nitrogen atmosphere at 600° C. to obtain external electrodes electrically connected with the internal electrodes.

The outer dimensions of the resultant laminated ceramic capacitor were 5.0 mm width, 5.7 mm length, and 2 mm thickness, and the thickness of the dielectric ceramic layer disposed between internal electrodes was 2.4 $\mu$m. The number of effective dielectric ceramic layers was five, and in each layer the opposing electrodes had an area of 16.3×10$^{-6}$ m$^2$.

The electrical properties of the resultant samples were measured as follows.

Electrostatic capacity (C) and dielectric loss (tan $\delta$) were measured by use of an automatic bridge instrument and according to JIS 5102, and dielectric constant ($\epsilon$) was calculated from the measured electrostatic capacity.

Resistance (R) was measured by use of an insulation tester; 10 V DC was applied for two minutes to obtain resistance (R) at 25° C., and specific resistivity was calculated from resistance.

With regard to temperature dependence of electrostatic capacity, the rate of variation ($\Delta$C/C$_{20}$) with respect to electrostatic capacity at 20° C. is shown for the temperature range of −25° C. to +85° C. and the rate of variation ($\Delta$C/C$_{25}$) with respect to electrostatic capacity at 25° C. is shown for the temperature range of −55° C. to +125° C.

The rate of variation of electrostatic capacity under electric field of 5 kV/mm ($\Delta$C %) was also obtained.

In a high temperature loading test, time-course change of resistance upon application of 20 V DC at 150° C. was measured. In this test, sample life was considered to be equal to the time until breakdown when the resistance (R) of the sample dropped to 10$^5$ $\Omega$ or less, and average life was calculated for several samples.

Breakdown voltage was measured by applying DC voltage at a voltage elevation rate of 100 V/sec.

Average particle size of the starting material was obtained through observation under a scanning microscope, and average grain size of the dielectric ceramic contained in the resultant laminated ceramic capacitor was obtained by chemically etching polished cross-sectional surfaces of the laminate and observing of the surfaces under a scanning microscope. From the results, ratio R, i.e., (average grain size of the dielectric ceramic product)/(average particle size of the starting material) was calculated.

The results are shown in Table 4.

loading test are in excess of 100 hours, to yield high reliability. The samples can be fired at a firing temperature of 1250° C. or less, and most can be fired at 1200° C. or less. The reasons why the above-described preferable compositional range is limited to the above values will next be described.

When the content of added Ca represented by x is less than about 0.02, as in Sample No. 1, the variation in dielectric constant with voltage, i.e., electric field, may be significant, and the average life in the high temperature loading test may be short. When x is in excess of about 0.15, as in Sample No. 2, the relative dielectric constant may be low and tan δ may be high.

TABLE 4

| Sample No. | Firing temperature (° C.) | Grain size ratio R | Dielectric constant | Dielectric loss tan δ (%) | Rate of variation in electrostatic capacity DC 5 kV/mm (ΔC %) | Rate of variation in electrostatic capacity with temperature | | Specific resistance ρ logρ (Ω · cm) | Breakdown voltage DC (kV/mm) | Average life (h) |
|---|---|---|---|---|---|---|---|---|---|---|
| | | | | | | $\Delta C/C_{20}$ (%) | $\Delta C/C_{25}$ (%) | | | |
| 1* | 1200 | 1.01 | 2800 | 2.1 | −55 | −9.9 | −15.3 | 13.2 | 15 | 22 |
| 2* | 1150 | 1.01 | 1120 | 3.4 | −35 | −4.6 | −6.6 | 13.1 | 14 | 20 |
| 3* | 1150 | 3.55 | 2590 | 2.5 | −64 | −15.6 | −25.0 | 11.4 | 12 | 12 |
| 4* | 1300 | 1.01 | 1830 | 2.7 | −49 | −8.0 | −15.2 | 13.2 | 14 | 1 |
| 5* | 1200 | 1.01 | 1920 | 2.3 | −55 | −9.1 | −15.2 | 11.0 | 15 | 3 |
| 6* | 1200 | 1.01 | 1710 | 2.4 | −53 | −14.2 | −20.2 | 11.3 | 14 | 8 |
| 7* | 1200 | 1.01 | 2060 | 4.6 | −60 | −12.4 | −19.0 | 11.1 | 8 | Not measurable |
| 8* | 1200 | 1.01 | 1990 | 2.7 | −62 | −12.4 | −17.3 | 11.5 | 9 | Not measurable |
| 9* | 1300 | 1.02 | 2080 | 3.0 | −50 | −8.9 | −14.1 | 12.3 | 8 | 2 |
| 10* | 1300 | 1.02 | 1520 | 3.9 | −48 | −8.7 | −14.0 | 11.4 | 8 | Not measurable |
| 11* | 1150 | 1.02 | 1730 | 2.8 | −47 | −15.1 | −29.9 | 13.5 | 14 | 4 |
| 12* | 1200 | 1.11 | 1700 | 2.3 | −59 | −15.2 | −16.7 | 13.2 | 13 | 11 |
| 13 | 1250 | 1.25 | 2540 | 2.2 | −52 | −5.3 | −14.9 | 13.0 | 13 | 41 |
| 14 | 1200 | 0.85 | 1180 | 2.5 | −51 | −8.2 | −14.9 | 13.2 | 14 | 115 |
| 15 | 1200 | 1.01 | 2890 | 1.6 | −49 | −4.9 | −6.6 | 13.1 | 14 | 53 |
| 16 | 1100 | 1.01 | 1040 | 2.2 | −31 | −9.8 | −14.9 | 13.2 | 15 | 214 |
| 17 | 1175 | 1.02 | 2200 | 2.2 | −35 | −9.4 | −14.0 | 13.3 | 15 | 118 |
| 18 | 1150 | 1.02 | 2120 | 2.2 | −40 | −8.7 | −13.7 | 13.1 | 14 | 146 |
| 19 | 1200 | 1.02 | 2150 | 2.1 | −42 | −9.1 | −14.0 | 13.2 | 14 | 125 |
| 20 | 1175 | 1.05 | 1680 | 2.3 | −39 | −5.2 | −8.2 | 13.1 | 15 | 175 |
| 21 | 1175 | 1.01 | 2330 | 2.1 | −41 | −9.6 | −14.6 | 13.1 | 14 | 85 |
| 22 | 1150 | 1.02 | 1280 | 1.9 | −33 | −8.2 | −12.6 | 13.2 | 15 | 191 |
| 23 | 1200 | 1.11 | 2510 | 2.2 | −43 | −9.4 | −14.3 | 13.1 | 14 | 101 |

The preferable composition of the dielectric ceramic according to the present invention is represented by $\{Ba_{1-x}Ca_xO\}_m TiO_2 + \alpha MgO + \beta MnO$, wherein $0.001 \leq \alpha \leq 0.05$; $0.001 \leq \beta \leq 0.025$; $1.000 < m \leq 1.035$; and $0.02 \leq x \leq 0.15$.

The above-described characteristics preferably fall within the following ranges: dielectric constant of 1000 or more; dielectric loss of 2.5% or less, and decrease in electrostatic capacity of 55% or less. With regard to the rate of variation in electrostatic capacity with temperature within the range of −25° C. to +85° C., the rate of variation with reference to electrostatic capacity at 20° C. is ±10% or less, and within the range of −55° C. to +125° C., the rate of variation ($\Delta C/C_{25}$) with reference to electrostatic capacity at 25° C. is ±15% or less. The specific resistivity is 13.0 Ω/cm or more and the breakdown voltage is 10 kV/mm or more.

In Tables 3 and 4, samples marked with * fall outside the above-described preferable compositional range.

As is clear from Table 4, each of Sample Nos. 13 to 23, whose composition falls within the preferable range, exhibits a rate of variation in electrostatic capacity with temperature that satisfies the B characteristics specified by JIS specifications within the range of −25° C. to +85° C. and that satisfies the X7R characteristics specified by EIA specifications within the range of −55° C. to +125° C. In addition, the average life of most of the samples in the high-temperature More preferably, the content of Ca, represented by x, is about 0.05 or more. This is more advantageous than the case where x falls within the range of at least about 0.02 and less than about 0.05.

When the content of added MgO represented by α is less than about 0.001, as in Sample No. 2, the specific resistivity may be low and temperature dependence of dielectric constant may fail to satisfy the B and X7R characteristics; whereas when α is in excess of about 0.05, as in Sample No. 4, the sintering temperature may increase and life in a high temperature loading test may be short.

When the content of added MnO represented by β is less than about 0.001, as in Sample No. 5, specific resistivity may be low; whereas when β is in excess of about 0.025, as in Sample No. 6, specific resistivity may be low and temperature dependence of dielectric constant may fail to satisfy the B and X7R characteristics.

When the ratio of (Ba, Ca)/Ti represented by m is less than about 1.000, as in Sample No. 7, specific resistivity may be low. When m is about 1.000, as in Sample No. 8, specific resistivity may also be low. Sample Nos. 7 and 8 may have shorter life in the high temperature loading test, and some samples were broken immediately upon application of voltage at high temperature. When ratio of (Ba, Ca)/Ti represented by m is in excess of about 1.035, as in Sample No.

9, sinterability may be poor and the sample may have a short life in the high temperature loading test.

When no sintering aid is added, as in sample No. 10, sintering may be poor to cause a large loss of specific resistivity due to plating and the sample may have a short life in the high temperature loading test; whereas when a sintering aid is added in an amount in excess of about 5.0 parts by weight, as in Sample No. 11, a secondary phase attributed to a glass component contained in the sintering aid may increase to thereby shorten life in the high temperature loading test.

When the content of an alkali metal oxide serving as an impurity contained in $(Ba, Ca)TiO_3$ is in excess of about 0.03 wt. %, as in Sample No. 12, life in the high temperature loading test may be short.

In Sample No. 14, the crushing conditions employed during the preparation of ceramic slurry was reinforced such that the particle size of powder in the slurry was smaller than that of starting raw material powder. The ratio of (average grain size of dielectric ceramic product)/(average particle size of provided starting material powder), which is represented by R, was as low as about 0.85, to cause a drop in dielectric constant. When the ratio R is as high as 1.25, as in Sample No. 13, grain growth is induced during firing, the ceramic grains between internal electrodes decrease in number, and the dielectric ceramic layer is thinned, to possibly shorten life in the high temperature loading test.

When the average grain size is as large as about 0.40 μm, as in Sample No. 15, the dielectric constant is high. In contrast, thinning a dielectric ceramic layer as in the case of Example 1 results in a short life in the high temperature loading test and large variation in dielectric constant under a high electric field. When the average grain size is as small as about 0.09 μm, as in Sample No. 16, the dielectric constant may be low and may have high dependence on temperature.

Particularly, in Sample Nos. 17 to 23, the dielectric constant falls within the range of 1280 to 2510 and variation of electrostatic capacity under high voltage is as low as less than 42%. No deterioration due to plating is observed. The samples have a long life in the high temperature loading test, as well as excellent reliability.

In the above Example, a powder was produced from $(Ba, Ca)TiO_3$ as a starting material through a solid phase synthesis method. However, the powder may be produced through a wet synthesis method such as an alkoxide method or a hydrothermal synthesis method.

Mg oxide and Mn oxide serving as additive components and a sintering aid containing $SiO_2$ were added in the form of oxide powders. No particular limitation is imposed on the form of addition so long as the dielectric ceramic phase falls within the scope of the present invention, and there may used a solution of a precursor thereof such as alkoxide or an organometallic compound. The yielded characteristics do not depend on the form of addition.

The surfaces of Ni grains contained in internal electrodes of a laminated ceramic capacitor intrinsically contain NiO. When firing conditions are favorable for oxidation, NiO forms in a large amount. The NiO may diffuse into a dielectric ceramic composition constituting a laminate during a firing step for producing the laminate of a laminated ceramic capacitor. A $ZrO_2$ component may be added in order to control sintering of internal electrodes. Such additive components may diffuse into the dielectric ceramic according to the present invention in a maximum amount of some mol % during firing. The inventors have confirmed that these electrode components, even when diffused, do not affect the electric characteristics of the dielectric ceramic composition according to the present invention.

These observations were also confirmed in the following Example 2.

Example 2

The procedure of Example 1 was performed, except that the average particle size of products was made greater, to thereby synthesize $(Ba, Ca)TiO_3$ having respective Ca contents and average particle sizes shown in the following Table 5.

TABLE 5

| Type of BaTiO$_3$ | Alkali metal oxide (wt. %) | CaO (mol fraction) | Average particle size (μm) |
|---|---|---|---|
| K | 0.003 | 0.004 | 0.50 |
| L | 0.010 | 0.100 | 0.50 |
| M | 0.012 | 0.150 | 0.50 |
| N | 0.015 | 0.170 | 0.50 |
| O | 0.062 | 0.100 | 0.50 |
| P | 0.003 | 0.100 | 0.35 |
| Q | 0.020 | 0.050 | 0.50 |
| R | 0.010 | 0.100 | 1.00 |
| S | 0.013 | 0.090 | 0.25 |
| T | 0.011 | 0.100 | 0.80 |
| U | 0.010 | 0.040 | 0.50 |

Sintering aids which were used in Example 2 were produced in a manner similar to that of Example 1, to thereby provide sintering aids predominantly comprising $SiO_2$, which are shown in Table 2.

Subsequently, the procedure of Example 1 was performed to prepare ceramic slurries, whose compositions are shown in Table 6. A sample of each resultant slurry was molded into a sheet by use of the doctor blade method to thereby obtain a rectangular green sheet having a thickness of 8 μm. Then, a conductive paste containing Ni as a primary component was applied on the resultant ceramic green sheet by way of printing to form conductive paste film for forming internal electrodes.

TABLE 6

| Sample No. | {Ba$_{1-x}$Ca$_x$O}$_m$TiO$_2$ + αMgO + βMnO | | | | | Sintering aid | |
|---|---|---|---|---|---|---|---|
| | Type of BaTiO$_3$ | x | m | α | β | Type | Parts by weight |
| 24* | K | 0.004 | 1.01 | 0.01 | 0.005 | a | 1.5 |
| 25* | N | .017 | 1.01 | 0.01 | 0.005 | a | 1.5 |
| 26* | L | 0.1 | 1.01 | 0.0008 | 0.005 | a | 1.5 |
| 27* | L | 0.1 | 1.01 | 0.06 | 0.005 | a | 1.5 |
| 28* | L | 0.1 | 1.01 | 0.01 | 0.0008 | a | 1.5 |
| 29* | L | 0.1 | 1.01 | 0.01 | 0.028 | a | 1.5 |
| 30* | L | 0.1 | 0.995 | 0.01 | 0.005 | a | 1.5 |
| 31* | L | 0.1 | 1 | 0.01 | 0.005 | a | 1.5 |
| 32* | L | 0.1 | 1.036 | 0.01 | 0.005 | a | 1.5 |
| 33* | L | 0.1 | 1.01 | 0.01 | 0.005 | a | 0 |
| 34* | L | 0.1 | 1.01 | 0.01 | 0.005 | a | 5.5 |
| 35* | O | 0.1 | 1.01 | 0.01 | 0.005 | a | 1.5 |
| 36 | L | 0.1 | 1.01 | 0.01 | 0.005 | a | 1.5 |
| 37 | L | 0.1 | 1.01 | 0.01 | 0.005 | a | 1.5 |
| 38 | R | 0.1 | 1.01 | 0.01 | 0.005 | a | 4 |
| 39 | S | 0.1 | 1.01 | 0.01 | 0.005 | a | 1 |
| 40 | L | 0.1 | 1.01 | 0.01 | 0.005 | b | 1.5 |
| 41 | L | 0.1 | 1.005 | 0.01 | 0.002 | a | 1.5 |
| 42 | L | 0.1 | 1.025 | 0.01 | 0.005 | b | 4 |
| 43 | U | 0.04 | 1.01 | 0.01 | 0.005 | a | 1.5 |
| 44 | M | .015 | 1.01 | 0.01 | 0.005 | c | 1.5 |
| 45 | P | 0.1 | 1.015 | 0.02 | 0.02 | a | 2 |

TABLE 6-continued

| Sam-ple No. | {Ba$_{1-x}$Ca$_x$O}$_m$TiO$_2$ + αMgO + βMnO | | | | Sintering aid | |
|---|---|---|---|---|---|---|
| | Type of BaTiO$_3$ | x | m | α | β | Type | Parts by weight |
| 46 | Q | 0.05 | 1.01 | 0.01 | 0.005 | a | 1.5 |
| 47 | T | 0.1 | 1.01 | 0.01 | 0.005 | a | 2 |
| 48* | L | 0.1 | 1.01 | 0 | 0.005 | a | 1.5 |
| 49* | L | 0.1 | 1.01 | 0.01 | 0 | a | 1.5 |

Subsequently, laminated ceramic capacitors were produced in the same way as in Example 1.

In the thus-obtained ceramic capacitor, the thickness of the dielectric ceramic layer disposed between internal electrodes was 6 μm.

Electrical properties were measured in the same methods as in Example 1 except that resistance (R) was measured by application of 60 V DC for two minutes, and time-course change of resistance upon application of 60 V DC at 150° C. was measured in the high temperature loading test.

Electrical properties obtained in Example 2 are shown in Table 7.

specifications within a range of −25° C. to +85° C. and that satisfies the X8R characteristics specified by EIA specifications within a range of −55° C. to +150° C. In addition, average sample lives of most of the samples in the high temperature loading test is in excess of 100 hours, and the samples can be fired at a firing temperature of 1250° C. or less. The reasons why the above-described preferable compositional range is limited as described will next be described.

When content of added Ca represented by x is less than about 0.02, as in Sample No. 24, the variation in dielectric constant with voltage may be significant, and average life in the high temperature loading test may be short; whereas when x is in excess of about 0.15, as in Sample No. 25, the relative dielectric constant may be low and tan δ may be high.

When content of added MgO represented by α is less than about 0.001, as in Sample No 26, the specific resistivity may be low due to grain growth during firing and temperature-dependent characteristics may fail to satisfy the B and X8R characteristics of dielectric constant; whereas when α is in excess of about 0.05, as in Sample No. 27, the sintering temperature may increase and life in the high temperature loading test may be shorter.

TABLE 7

| Sample No. | Firing temperature (° C.) | Grain size ratio R | Dielectric constant | Dielectric loss tan δ (%) | Rate of variation in electrostatic capacity DC 5 kV/mm (ΔC %) | Rate of variation in electrostatic capacity with temperature | | Specific resistance ρ logρ (Ω · cm) | Breakdown voltage DC (kV/mm) | Average life (h) |
|---|---|---|---|---|---|---|---|---|---|---|
| | | | | | | ΔC/C$_{20}$ (%) | ΔC/C$_{25}$ (%) | | | |
| 24* | 1250 | 1.01 | 3600 | 2.7 | −67 | −10.2 | −18.4 | 13.3 | 14 | 21 |
| 25* | 1200 | 1.01 | 1720 | 3.3 | −39 | −2.4 | −13.7 | 13.2 | 15 | 30 |
| 26* | 1200 | 3.25 | 3050 | 2.6 | −67 | −13.6 | −28.7 | 11.2 | 13 | 20 |
| 27* | 1350 | 1.01 | 2630 | 2.8 | −54 | −6.1 | −18.1 | 13.4 | 15 | 1 |
| 28* | 1250 | 1.01 | 2720 | 2.4 | −58 | −7.1 | −18.3 | 11.1 | 14 | 3 |
| 29* | 1250 | 1.01 | 2510 | 2.4 | −59 | −12.2 | −19.4 | 11.2 | 15 | 6 |
| 30* | 1250 | 1.01 | 2860 | 4.6 | −66 | −10.4 | −19.3 | 11.0 | 8 | Not measurable |
| 31* | 1250 | 1.01 | 2790 | 2.6 | −67 | −10.1 | −17.2 | 11.6 | 8 | Not measurable |
| 32* | 1350 | 1.02 | 2880 | 3.1 | −55 | −7.1 | −14.3 | 12.2 | 9 | 2 |
| 33* | 1350 | 1.02 | 2320 | 3.7 | −52 | −6.9 | −18.0 | 11.3 | 8 | Not measurable |
| 34* | 1200 | 1.02 | 2530 | 2.9 | −52 | −13.1 | −32.3 | 13.3 | 15 | 4 |
| 35* | 1250 | 1.11 | 2500 | 2.4 | −62 | −13.2 | −19.7 | 13.4 | 14 | 15 |
| 36 | 1275 | 1.25 | 3000 | 2.1 | −53 | −8.2 | −14.8 | 12.8 | 12 | 44 |
| 37 | 1200 | 0.88 | 1870 | 5.4 | −59 | −9.8 | −14.9 | 13.1 | 13 | 89 |
| 38 | 1250 | 1.02 | 4810 | 3.1 | −62 | −2.8 | −10.4 | 13.2 | 13 | 65 |
| 39 | 1175 | 1.01 | 1900 | 2.1 | −36 | −8.8 | −13.9 | 13.1 | 14 | 241 |
| 40 | 1225 | 1.01 | 3000 | 2.4 | −41 | −7.5 | −14.8 | 13.3 | 15 | 121 |
| 41 | 1200 | 1.02 | 2920 | 2.5 | −44 | −6.8 | −14.3 | 13.2 | 14 | 175 |
| 42 | 1250 | 1.02 | 2950 | 2.3 | −45 | −7.1 | −14.2 | 13.1 | 13 | 161 |
| 43 | 1225 | 1.01 | 2980 | 2.4 | −43 | −8.6 | −14.3 | 13.3 | 13 | 95 |
| 44 | 1225 | 1.11 | 2050 | 2.4 | −42 | −3.1 | −13.2 | 13.4 | 15 | 251 |
| 45 | 1200 | 1.01 | 2050 | 2.2 | −37 | −6.2 | −13.8 | 13.3 | 14 | 237 |
| 46 | 1250 | 1.01 | 3200 | 2.3 | −44 | −7.2 | −14.2 | 13.2 | 15 | 146 |
| 47 | 1200 | 1.01 | 3460 | 2.5 | −49 | −6.1 | −13.5 | 13.1 | 14 | 98 |
| 48* | 1200 | 6.25 | 3070 | 2.7 | −78 | +24.2 | +220.5 | 12.8 | 13 | 17 |
| 49* | 1225 | 1.02 | 2940 | 2.5 | −43 | −7.3 | −14.2 | 11.4 | 11 | Not measurable |

As described in connection with Example 1, the preferable composition of the dielectric ceramic according to the present invention is represented by {Ba$_{1-x}$Ca$_x$O}$_m$TiO$_2$+αMgO+βMnO, wherein $0.001 \leq \alpha \leq 0.05$; $0.001 \leq \beta \leq 0.025$; $1.000 < m \leq 1.035$; and $0.05 \leq x \leq 0.15$.

In Tables 6 and 7, samples marked with * fall outside the above-described preferable compositional range.

As is clear from Table 7, each of Sample Nos. 36 to 47, whose composition falls within the preferable range, exhibits a rate of variation in electrostatic capacity with temperature that satisfies the B characteristics specified by JIS When content of added MnO represented by β is less than about 0.001, as in Sample 28, the specific resistivity may be low; whereas when β is in excess of about 0.025, as in Sample No. 29, the specific resistivity may be low and temperature-dependent characteristics may fail to satisfy the B and X8R characteristics.

When the ratio of (Ba, Ca)/Ti represented by m is less than about 1.000, as in the case of Sample No 31, and when m is 1.000, as in the case of Sample No. 31, the specific resistivity may also be low. Sample Nos. 30 and 31 may have a much shorter life in the high temperature loading test, and some samples were broken immediately upon application of voltage at high temperature. When the ratio of (Ba, Ca)/Ti represented by m is in excess of about 1.035, as in Sample No. 32, the sinterability may be poor and the sample may have a shorter life in the high temperature loading test.

When no sintering aid is added, as in the case of Sample No. 33, sintering may be poor to result in large loss of specific resistivity due to plating, and the sample may have a shorter life in the high temperature loading test; whereas when a sintering aid is added in an amount in excess of about 5.0 parts by weight, as in the case of Sample No. 34, production of a secondary phase based on a glass component contained in the sintering aid may increase to thereby shorten life in the high temperature loading test.

When the content of an alkali metal oxide serving as an impurity contained in (Ba, Ca)TiO$_3$, is in excess of about 0.03 wt. %, as in Sample No. 35, the sample may have a shorter life in the high temperature loading test.

When the ratio of (average grain size of dielectric ceramic)/(average particle size of provided starting material powder), represented by R, is as small as about 0.88, as in Sample No. 37, the dielectric constant is excessively low; whereas the ratio R is as high as about 1.25, as in the case of Sample No. 36, grain growth is increased during firing, causing the ceramic grains between internal electrodes to decrease in number when the dielectric ceramic layer is thinned, to possibly shorten life in the high temperature loading test.

When MgO is not present, as in the case of Sample No. 48, the ratio R is as high as about 6.25, showing remarkable grain growth, and the variation in dielectric constant is disadvantageously large. When MnO is not present, as in Sample No. 49, the specific resistivity is low and life in the high temperature loading test is disadvantageously shortened.

In Example 2, the dielectric ceramic layer has a thickness of 6 μm. When average grain size is as large as about 1.00 μm, as in Sample No. 38, the variation in dielectric constant with temperature is small, but variation in dielectric constant with voltage is large, and life in the high temperature loading test may be short. In contrast, when the average grain size is as small as about 0.25 μm, as in Sample No. 39, the dielectric constant may be low due to low electric field applied to the dielectric ceramic layer.

In Sample Nos. 40 to 47, the dielectric constant falls within the range of 2050 to 3460 and the dielectric ceramic layer is relatively thick. In Example 2, variation of electrostatic capacity under high electric field is as low as less than 50%. No deterioration due to plating is observed. The samples have a long life in the high temperature loading test, and excellent reliability.

Example 3

The laminated ceramic capacitor produced in the present Example is also the laminated ceramic capacitor 1 having a structure shown in FIG. 1.

High-purity TiO$_2$, BaCO$_3$, CaCO$_3$ and RE$_2$O$_3$, wherein RE represents an element selected from Y, Gd, Tb, Dy, Ho, Er and Yb, serving as starting materials were weighed in amounts such that the produced mixtures had contents of Ca and RE shown in the following Table 8, and were then mixed and crushed. Each sample of the resultant powders was dried and heated at 1000° C. or more, to thereby synthesize {Ba$_{1-x-y}$Ca$_x$R$_y$O}TiO$_2$ having respective average particle sizes shown in Table 8.

TABLE 8

| Type of BaTiO$_3$ | IA metal oxide (wt. %) | CaO (mol fraction) | Average particle size (μm) | Rare earth element (mol fraction) | | | | | |
|---|---|---|---|---|---|---|---|---|---|
| | | | | Y | Gd | Tb | Dy | Ho | Er | Tb |
| A' | 0.003 | 0.003 | 0.20 | | | | 0.04 | | | |
| B' | 0.010 | 0.100 | 0.20 | | | | 0.04 | | | |
| C' | 0.010 | 0.100 | 0.20 | | | | 0.005 | | | |
| D' | 0.013 | 0.130 | 0.20 | | | | 0.065 | | | |
| E' | 0.015 | 0.170 | 0.18 | | | | 0.04 | | | |
| F' | 0.062 | 0.100 | 0.20 | | | | 0.04 | | | |
| G' | 0.003 | 0.080 | 0.15 | | | | 0.04 | | | |
| H' | 0.010 | 0.100 | 0.40 | | | | 0.04 | | | |
| I' | 0.010 | 0.100 | 0.09 | | | | 0.04 | | | |
| J' | 0.010 | 0.100 | 0.25 | 0.05 | | | | | | |
| K' | 0.010 | 0.100 | 0.18 | | 0.04 | | | | | |
| L' | 0.010 | 0.100 | 0.20 | | | 0.05 | | | | |
| M' | 0.010 | 0.100 | 0.20 | | | | | 0.04 | | |
| N' | 0.010 | 0.100 | 0.28 | | | | | | 0.04 | |
| O' | 0.010 | 0.100 | 0.19 | | | | | | | 0.04 |
| P' | 0.010 | 0.100 | 0.20 | 0.01 | | | 0.04 | | | |
| Q' | 0.010 | 0.020 | 0.20 | | | | 0.04 | | | |

In order to obtain an oxide powder which serves as a sintering aid predominantly comprising SiO$_2$, component oxides or carbonates and hydroxides thereof were weighed in amounts such that the produced mixtures had compositional ratios represented by mole ratio shown in the following Table 9, and were then mixed and crushed. Each sample of the resultant powders was heated to 1500° C. in a platinum crucible, quenched and crushed, to thereby attain an average particle size of 1 μm or less.

TABLE 9

| Type of sintering aid | Composition of sintering aid (wt. %) | | | | |
|---|---|---|---|---|---|
| | SiO$_2$ | TiO$_2$ | BaO | CaO | SrO |
| a' | 80 | 15 | 5 | 0 | 0 |
| b' | 50 | 30 | 0 | 20 | 0 |
| c' | 45 | 45 | 10 | 0 | 0 |

TABLE 9-continued

| Type of sintering aid | Composition of sintering aid (wt. %) | | | | |
|---|---|---|---|---|---|
| | $SiO_2$ | $TiO_2$ | BaO | CaO | SrO |
| d' | 35 | 35 | 20 | 10 | 0 |
| e' | 45 | 22 | 3 | 30 | 0 |
| f' | 25 | 40 | 15 | 10 | 10 |

$BaCO_3$, MgO and MnO were employed so as to adjust the mole ratio of (Ba, Ca, RE)/Ti in $\{Ba_{1-x-y}Ca_xRE_yO\}_m TiO_2$ represented by m.

Subsequently, respective additives were added to each sample of the starting material powders, to thereby obtain mixtures having respective compositions shown in Table 10. A polyvinyl butyral binder and organic solvent such as ethanol were added to each mixture, and the ingredients were subjected to wet milling by use of a ball mill so as to prepare a ceramic slurry. The resultant slurry was molded into a sheet by use of a doctor blade method to thereby obtain a rectangular green sheet having a thickness of 2.7 μm. Then, a conductive paste containing Ni as a primary component was applied on the resultant ceramic green sheet by way of printing to form a conductive paste film for forming internal electrodes.

Subsequently, a plurality of the thus-obtained ceramic green sheets were laminated such that leading ends of the above-mentioned conductive paste films on the sheets were arranged alternately, to thereby obtain a laminate. The resultant laminate was heated at 350° C. in an atmosphere of $N_2$ so as to burn the binder, and then fired for two hours at a temperature shown in Table 11 in a reducing atmosphere of $H_2$-$N_2$-$H_2O$ gas containing oxygen at a partial pressure of $10^{-9}$ to $10^{-12}$ MPa.

A silver paste containing $B_2O_3$-$Li_2O$-$SiO_2$-BaO glass frit was applied to the opposite side faces of the fired laminate, followed by burning in a nitrogen atmosphere at 600° C. to obtain external electrodes electrically connected with the internal electrodes.

The outer dimensions of the resultant laminated ceramic capacitor were 5.0 mm in width, 5.7 mm in length, and 2.4 mm in thickness, and the thickness of the dielectric ceramic layer disposed between internal electrodes was 2 μm. The number of effective dielectric ceramic layers was five, and in each layer the opposite electrodes had an area of $16.3 \times 10^{-6}$ m$^2$.

The electrical properties of the resultant samples were measured as follows.

Electrostatic capacity (C) and dielectric loss (tan δ) were measured by use of an automatic bridge instrument and according to JIS 5102, and dielectric constant (ε) was calculated from the measured electrostatic capacity.

Resistance (R) was measured by use of an insulation tester; 10 V DC was applied for two minutes to obtain resistance (R) at 25° C., and specific resistivity was calculated from the measured resistance.

With regard to the temperature dependence of electrostatic capacity, the rate of variation ($\Delta C/C_{20}$) with respect to electrostatic capacity at 20° C. is shown for the temperature range of –25° C. to +85° C., and the rate of variation ($\Delta C/C_{25}$) with respect to electrostatic capacity at 25° C. is shown for the temperature range of –55° C. to +125° C.

The rate of variation of electrostatic capacity under electric field of 5 kV/mm (ΔC %) was also obtained.

In the high temperature loading test, the time-course change of resistance upon application of 20 V DC at 150° C. was measured. In this test, average sample life was evaluated, wherein sample life was considered to be equal to

TABLE 10

| | $\{Ba_{1-x-y}Ca_xRE_yO\}_m TiO_2 + \alpha MgO + \beta MnO$ | | | | | | | Sintering aid | |
|---|---|---|---|---|---|---|---|---|---|
| Sample No. | Type of $BaTiO_3$ | x | y | m | Type of RE | α | β | Type | Parts by weight |
| 101* | A' | 0.003 | 0.04 | 1.01 | Dy | 0.03 | 0.005 | d' | 1 |
| 102* | E' | 0.170 | 0.04 | 1.01 | Dy | 0.03 | 0.005 | d' | 1 |
| 103* | C' | 0.100 | 0.0005 | 1.01 | Dy | 0.03 | 0.005 | d' | 1 |
| 104* | D' | 0.130 | 0.065 | 1.01 | Dy | 0.03 | 0.005 | d' | 1 |
| 105* | B' | 0.100 | 0.04 | 1.01 | Dy | 0.0008 | 0.005 | d' | 1 |
| 106* | B' | 0.100 | 0.04 | 1.01 | Dy | 0.13 | 0.005 | d' | 1 |
| 107* | B' | 0.100 | 0.04 | 1.01 | Dy | 0.03 | 0.0009 | d' | 1 |
| 108* | B' | 0.100 | 0.04 | 1.01 | Dy | 0.03 | 0.028 | d' | 1 |
| 109* | B' | 0.100 | 0.04 | 0.996 | Dy | 0.03 | 0.005 | d' | 1 |
| 110* | B' | 0.100 | 0.04 | 1 | Dy | 0.03 | 0.005 | d' | 1 |
| 111* | B' | 0.100 | 0.04 | 1.036 | Dy | 0.03 | 0.005 | d' | 1 |
| 112* | B' | 0.100 | 0.04 | 1.01 | Dy | 0.005 | 0.005 | d' | 0 |
| 113* | B' | 0.100 | 0.04 | 1.01 | Dy | 0.03 | 0.005 | d' | 0 |
| 114* | B' | 0.100 | 0.04 | 1.01 | Dy | 0.03 | 0.005 | d' | 5.5 |
| 115* | F' | 0.100 | 0.04 | 1.01 | Dy | 0.03 | 0.005 | d' | 1 |
| 116 | H' | 0.100 | 0.04 | 1.01 | Dy | 0.03 | 0.005 | d' | 1 |
| 117 | I' | 0.100 | 0.04 | 1.01 | Dy | 0.03 | 0.005 | d' | 1 |
| 118 | B' | 0.100 | 0.04 | 1.01 | Dy | 0.03 | 0.005 | d' | 1 |
| 119 | B' | 0.100 | 0.04 | 1.01 | Dy | 0.005 | 0.005 | d' | 2 |
| 120 | J' | 0.100 | 0.05 | 1.025 | Y | 0.03 | 0.008 | a' | 4 |
| 121 | K' | 0.100 | 0.04 | 1.02 | Gd | 0.03 | 0.005 | a' | 3 |
| 122 | L' | 0.100 | 0.05 | 1.015 | Tb | 0.03 | 0.005 | b' | 2 |
| 123 | M' | 0.100 | 0.04 | 1.01 | Ho | 0.03 | 0.005 | c' | 1 |
| 124 | N' | 0.100 | 0.04 | 1.01 | Er | 0.03 | 0.005 | c' | 1 |
| 125 | O' | 0.100 | 0.04 | 1.01 | Tb | 0.03 | 0.005 | d' | 1 |
| 126 | P' | 0.100 | 0.05 | 1.005 | Y, Dy | 0.03 | 0.005 | e' | 1 |
| 127 | Q' | 0.020 | 0.04 | 1.010 | Dy | 0.03 | 0.005 | d' | 1 |
| 128 | G' | 0.80 | 0.04 | 1.015 | Dy | 0.03 | 0.005 | f' | 0.5 | the time until breakdown when the resistance (R) of the sample dropped to $10^5$ Ω or less.

Breakdown voltage was measured by applying DC voltage at a voltage elevation rate of 100 V/sec.

Average particle size of the starting raw material was obtained through observation under a scanning microscope, and average grain size of the dielectric ceramic contained in the resultant laminated ceramic capacitor was obtained by chemically etching polished cross-sectional surfaces of the laminate and observing the surfaces under a scanning microscope. From the results, ratio R, i.e., (average grain size of the dielectric ceramic product)/(average particle size of the starting material) was calculated.

The results are shown in Table 11.

exhibits a rate of variation in electrostatic capacity with temperature that satisfies the B characteristics specified by JIS specifications within the range of −25° C. to +85° C., and that satisfies the X7R characteristics specified by EIA specifications within the range of −55° C. to +125° C. In addition, average sample life in the high temperature loading test is almost 100 hours, at least 70 hours or more, to yield high reliability. The samples can be fired at a firing temperature of 1200° C. or less. The reasons why the above-described preferable compositional range is limited to the above values will next be described.

When content of added Ca represented by x is less than about 0.02, as in Sample No. 101, the variation in dielectric constant with voltage may be significant, and life in the high temperature loading test may be short. When x is in excess

TABLE 11

| Sample No. | Firing temperature (° C.) | Grain size ratio R | Dielectric constant | Dielectric loss tan δ (%) | Rate of variation in electrostatic capacity DC 5 kV/mm (ΔC %) | Rate of variation in electrostatic capacity with temperature ΔC/C$_{20}$ (%) | ΔC/C$_{25}$ (%) | Specific resistance ρ logρ (Ω · cm) | Breakdown voltage DC (kV/mm) | Average life (h) |
|---|---|---|---|---|---|---|---|---|---|---|
| 101* | 1250 | 1.02 | 3200 | 3.1 | −65 | −9.4 | −15.8 | 13.3 | 14 | 1 |
| 102* | 1200 | 1.01 | 1020 | 3.8 | −34 | −4.5 | −5.5 | 13.3 | 15 | 22 |
| 103* | 1200 | 1.01 | 2400 | 2.0 | −48 | −2.5 | −11.5 | 13.2 | 14 | 50 |
| 104* | 1200 | 1.01 | 1200 | 2.8 | −56 | −19.3 | −16.0 | 13.4 | 14 | 100 |
| 105* | 1200 | 1.35 | 2610 | 2.6 | −66 | −17.0 | −28.0 | 11.3 | 11 | 15 |
| 106* | 1250 | 1.02 | 1690 | 2.7 | −51 | −7.7 | −15.5 | 13.1 | 15 | 2 |
| 107* | 1200 | 1.01 | 1890 | 2.0 | −55 | −9.3 | −15.3 | 11.4 | 13 | 16 |
| 108* | 1200 | 1.01 | 1700 | 2.5 | −57 | −16.0 | −20.1 | 11.0 | 14 | 7 |
| 109* | 1200 | 1.01 | 2000 | 4.7 | −62 | −14.0 | −19.2 | 11.4 | 10 | Not measurable |
| 110* | 1200 | 1.01 | 1970 | 2.9 | −60 | −12.5 | −17.3 | 11.2 | 8 | Not measurable |
| 111* | 1250 | 1.01 | 2060 | 3.0 | −51 | −9.0 | −14.1 | 12.4 | 8 | 3 |
| 112* | 1250 | 1.02 | 1490 | 3.5 | −43 | −8.9 | −13.5 | 11.1 | 11 | Not measurable |
| 113* | 1250 | 1.02 | 1500 | 3.9 | −44 | −8.7 | −14.0 | 11.3 | 8 | Not measurable |
| 114* | 1150 | 1.01 | 1690 | 2.8 | −46 | −15.5 | −32.1 | 13.2 | 14 | 5 |
| 115* | 1200 | 1.00 | 1700 | 2.4 | −60 | −14.9 | −17.5 | 13.1 | 14 | 11 |
| 116 | 1200 | 1.00 | 1890 | 1.7 | −42 | −8.8 | −13.4 | 13.2 | 13 | 70 |
| 117 | 1100 | 1.00 | 1300 | 2.2 | −30 | −9.9 | −14.9 | 13.3 | 14 | 230 |
| 118 | 1100 | 0.85 | 1600 | 2.2 | −30 | −10.0 | −14.8 | 13.3 | 13 | 150 |
| 119 | 1200 | 1.30 | 2900 | 2.1 | −42 | −9.8 | −14.9 | 13.5 | 15 | 75 |
| 120 | 1150 | 1.00 | 1320 | 2.1 | −35 | −9.4 | −14.2 | 13.4 | 15 | 150 |
| 121 | 1150 | 1.00 | 1280 | 2.5 | −34 | −8.7 | −14.1 | 13.5 | 13 | 135 |
| 122 | 1125 | 1.00 | 1300 | 2.3 | −36 | −9.3 | −14.0 | 13.2 | 15 | 150 |
| 123 | 1150 | 1.00 | 1950 | 2.0 | −38 | −8.8 | −13.5 | 13.1 | 14 | 120 |
| 124 | 1200 | 1.01 | 1900 | 2.1 | −37 | −7.9 | −13.0 | 13.5 | 14 | 125 |
| 125 | 1200 | 1.01 | 1410 | 2.3 | −35 | −8.1 | −11.8 | 13.1 | 13 | 150 |
| 126 | 1200 | 1.00 | 1420 | 2.2 | −29 | −7.7 | −11.0 | 13.0 | 15 | 150 |
| 127 | 1125 | 1.00 | 1540 | 2.2 | −38 | −9.5 | −14.4 | 13.3 | 14 | 80 |
| 128 | 1125 | 1.00 | 1310 | 2.1 | −31 | −9.2 | −14.2 | 13.5 | 15 | 135 |

The preferable composition of the dielectric ceramic according to the present invention is represented by $\{Ba_{1-x-y}Ca_xREO\}_m TiO_2 + \alpha MgO + \beta MnO$, wherein $0.001 \leq \alpha \leq 0.05$; $0.001 \leq \beta \leq 0.025$; $1.000 < m \leq 1.035$; $0.02 \leq x \leq 0.15$; and $0.001 \leq y \leq 0.06$.

The above-described characteristics preferably fall within the following ranges: dielectric constant of 1200 or more; dielectric loss of 2.5% or less; and decrease in electrostatic capacity of 45% or less. With regard to the rate of variation in electrostatic capacity with temperature within the range of −25° C. to +85° C., the rate of variation with respect to electrostatic capacity at 20° C. is ±10%, and within the range of −55° C. to +125° C., the rate of variation (ΔC/C$_{25}$) with respect to electrostatic capacity at 25° C. is ±15%. The specific resistivity is 13.0 Ω/cm or more and the breakdown voltage is 10 kV/mm or more.

In Tables 10 and 11, samples marked with * fall outside the above-described preferable compositional range.

As is clear from Table 11, each of Sample Nos. 116 to 128, in which compositional falls within the preferable range, of about 0.15, as in Sample No. 102, the relative dielectric constant may be low and tan δ may be high.

More preferably, Ca content, represented by x, is about 0.05 or more. This is more advantageous than the case where x falls within the range of at least abut 0.02 and less than about 0.05.

When content of added RE, represented by y, is less than about 0.001, as in Sample No. 103, the average life may be short; whereas when y is in excess of about 0.06, as in the case of Sample No. 104, the temperature-dependent characteristics may fail to satisfy the B and X7R characteristics.

When the content of added MgO represented by α is less than about 0.001, as in Sample No. 105, the specific resistivity may be low and temperature-dependent characteristics may fail to satisfy the B and X7R characteristics; whereas when α is in excess of about 0.05, as in Sample No. 106, the sintering temperature may increase and life in the high temperature loading test may be short.

When the content of added MgO represented by β is less than about 0.001, as in Sample No. 107, the specific resistivity may be low; whereas when β is in excess of about 0.025, as in Sample No. 107, the specific resistivity may be low and temperature-dependent characteristics may fail to satisfy the B and X7R characteristics.

When the ratio of (Ba, Ca, RE)/Ti represented by m is less than about 1.000, as in Sample No. 109, the specific resistivity may be low. When m is 1.000, as in Sample No. 110, the specific resistivity may also be low. Sample Nos. 109 and 110 may have much shorter life in the high temperature loading test, and some samples were broken immediately upon application of voltage at high temperature. When the ratio of (Ba, Ca, RE)/Ti represented by m is in excess of about 1.035, as in Sample No. 111, the sinterability may be poor and the sample may have a short life in the high temperature loading test.

When no sintering aid is added, as in Sample Nos. 112 and 113, sintering may be poor to cause a large loss of specific resistivity due to plating and life in the high temperature loading test may be short; whereas when a sintering aid is added in an amount in excess of about 5.0 parts by weight, as in Sample No. 114, production of a secondary phase of a glass component contained in the sintering aid may increase to thereby shorten life in the high temperature loading test.

When the content of an alkali metal oxide serving as an impurity contained in $\{Ba_{1-x-y}Ca_xRE_yO\}TiO_2$ is in excess of about 0.03 wt. %, as in Sample No. 115, life in the high temperature loading test may be short.

When average grain size is as large as about 0.40 μm, as in Sample No. 116, the dielectric constant is large. In contrast, thinning a dielectric ceramic layer as in the case of the Example 3 results in short sample life in the high temperature loading test and large variation in dielectric constant under high voltage. When average grain size is as small as about 0.09 μm, as in Sample No. 117, excellent reliability is realized, but the dielectric constant may be low and variation in dielectric constant with temperature may be large.

In Sample No. 118, the employed crushing condition during the preparation of the ceramic slurry was reinforced such that the particle size of powder in the slurry became smaller than that of starting raw material powder. The ratio of (average grain size of dielectric ceramic product)/ (average particle size of provided starting material powder), which is represented by R, is as small as about 0.85, to lower the dielectric constant. In contrast, when the ratio R is as high as about 1.30, as in the case of Sample No. 119, grain growth is induced during firing, causing the ceramic grains between internal electrodes to decrease in number when a dielectric layer is thinned, to possibly shorten life in the high temperature loading test.

Particularly, in Sample Nos. 120 to 128, the dielectric constant falls within the range of 1280 to 1950 and variation of electrostatic capacity under high voltage is as low as less than 40%. No deterioration due to plating was observed. The samples have long life in the high temperature loading test, and have excellent reliability.

In the above example, a solid phase synthesis method was employed to produce a powder from $\{Ba_{1-x-y}Ca_xRE_yO\}TiO_2$ serving as a starting material. However, the powder may be produced through a wet synthesis method such as an alkoxide method or a hydrothermal synthesis method.

Mg oxide and Mn oxide serving as additive components and a sintering aid containing $SiO_2$ were added in the form of oxide powders. No particular limitation is imposed on the form of addition so long as the dielectric ceramic layer falls within the scope of the present invention, and there may be used a solution of a precursor thereof such as alkoxide or an organometallic compound. The provided characteristics do not depend on the form of addition.

The surfaces of Ni grains contained in internal electrodes of a laminated ceramic capacitor intrinsically contain NiO. When firing conditions are favorable for oxidation, NiO forms in a large amount. The NiO may diffuse into a dielectric ceramic composition constituting a laminate during a firing step for producing the laminate of a laminated ceramic capacitor. A $ZrO_2$ component may be added in order to control sintering of internal electrodes. During firing, such additive components may diffuse into a composition for producing the dielectric ceramic according to the present invention in a maximum amount of some mol %. The inventors have confirmed that these electrode components, even when diffused, have no affect on the electric characteristics of the dielectric ceramic composition according to the present invention.

These observations are also confirmed in Example 4.

Example 4

The procedure of Example 3 was performed, except that average particle size of products was made greater, to thereby synthesize $\{Ba_{1-x-y}Ca_xRE_yO\}TiO_2$ having Ca contents, RE contents, and average particle sizes shown in the following Table 12.

TABLE 12

| Type of BaTiO$_3$ | Alkali Metal Oxide (wt %) | CaO (mol fraction) | Average Particle Size (μm) | Rare Earth Element (mol fraction) | | | | | |
|---|---|---|---|---|---|---|---|---|---|
| | | | | Y | Gd | Tb | Dy | Ho | Er | Tb |
| R' | 0.003 | 0.003 | 0.60 | | | | 0.04 | | | |
| S' | 0.010 | 0.100 | 0.60 | | | | 0.04 | | | |
| T' | 0.010 | 0.100 | 0.60 | | | | 0.0005 | | | |
| U' | 0.013 | 0.130 | 0.60 | | | | 0.065 | | | |
| V' | 0.015 | 0.170 | 0.50 | | | | 0.04 | | | |
| W' | 0.062 | 0.100 | 0.60 | | | | 0.04 | | | |
| X' | 0.003 | 0.080 | 0.50 | | | | 0.04 | | | |
| Y' | 0.010 | 0.100 | 1.20 | | | | 0.04 | | | |
| Z' | 0.010 | 0.100 | 0.25 | | | | 0.04 | | | |
| AA' | 0.010 | 0.100 | 0.65 | 0.05 | | | | | | |
| AB' | 0.010 | 0.100 | 0.55 | | 0.04 | | | | | |
| AC' | 0.010 | 0.100 | 0.60 | | | 0.05 | | | | |
| AD' | 0.010 | 0.100 | 0.60 | | | | | | | 0.04 |

TABLE 12-continued

| Type of BaTiO$_3$ | Alkali Metal Oxide (wt %) | CaO (mol fraction) | Average Particle Size (μm) | Rare Earth Element (mol fraction) | | | | | |
|---|---|---|---|---|---|---|---|---|---|
| | | | | Y | Gd | Tb | Dy | Ho | Er | Tb |
| AE' | 0.010 | 0.100 | 0.65 | | | | | | 0.04 | |
| AF' | 0.010 | 0.100 | 0.55 | | | | | | | 0.04 |
| AG' | 0.010 | 0.100 | 0.60 | 0.01 | | | 0.04 | | | |
| AH' | 0.010 | 0.040 | 0.60 | | | | 0.04 | | | |

Sintering aids used in Example 4 were produced in a manner similar to that of Example 1, to thereby provide sintering aids predominantly comprising $SiO_2$, which are shown in Table 2.

Subsequently, the procedure of Example 3 was performed to prepare ceramic slurries, whose compositions are shown in Table 13. A sample of each resultant slurry was molded into a sheet by use of the doctor blade method to thereby obtain a rectangular green sheet having a thickness of 8 μm. Then, conductive paste containing Ni as a primary component was applied on the resultant ceramic green sheet by way of printing to form conductive paste film for forming internal electrodes.

Subsequently, laminated ceramic capacitors were produced as in Example 3.

In the thus-obtained ceramic capacitors, the thickness of the dielectric ceramic layer disposed between internal electrodes was 6 μm.

Electrical properties were measured as in Example 3, except that resistance (R) was measured by application of 60 V DC for two minutes and the time-course change of resistance upon application of 60 V DC at 150° C. was measured in the high temperature loading test.

Electrical properties obtained in Example 4 are shown in Table 14.

TABLE 13

| | | $\{Ba_{1-x}Ca_xRE_yO\}_mTiO_2 + \alpha MgO + \beta MnO$ | | | | | | Sintering aid | |
|---|---|---|---|---|---|---|---|---|---|
| Sample No. | Type of BaTiO$_3$ | x | y | m | Re | α | β | Type | Parts by weight |
| 29* | R' | 0.003 | 0.04 | 1.01 | Dy | 0.03 | 0.005 | d' | 1 |
| 30* | V' | 0.170 | 0.04 | 1.01 | Dy | 0.03 | 0.005 | d' | 1 |
| 31* | T' | 0.100 | 0.0005 | 1.01 | Dy | 0.03 | 0.005 | d' | 1 |
| 32* | U' | 0.130 | 0.065 | 1.01 | Dy | 0.03 | 0.005 | d' | 1 |
| 33* | S' | 0.100 | 0.04 | 1.01 | Dy | 0.0008 | 0.005 | d' | 1 |
| 34* | S' | 0.100 | 0.04 | 1.01 | Dy | 0.13 | 0.005 | d' | 1 |
| 35* | S' | 0.100 | 0.04 | 1.01 | Dy | 0.03 | 0.0009 | d' | 1 |
| 36* | S' | 0.100 | 0.04 | 1.01 | Dy | 0.03 | 0.028 | d' | 1 |
| 37* | S' | 0.100 | 0.04 | 0.996 | Dy | 0.03 | 0.005 | d' | 1 |
| 38* | S' | 0.100 | 0.04 | 1 | Dy | 0.03 | 0.005 | d' | 1 |
| 39* | S' | 0.100 | 0.04 | 1.036 | Dy | 0.03 | 0.005 | d' | 1 |
| 40* | S' | 0.100 | 0.04 | 1.01 | Dy | 0.005 | 0.005 | d' | 0 |
| 41* | S' | 0.100 | 0.04 | 1.01 | Dy | 0.03 | 0.005 | d' | 0 |
| 42* | S' | 0.100 | 0.04 | 1.01 | Dy | 0.03 | 0.005 | d' | 5.5 |
| 43* | W' | 0.100 | 0.04 | 1.01 | Dy | 0.03 | 0.005 | d' | 1 |
| 44 | Y' | 0.100 | 0.04 | 1.01 | Dy | 0.03 | 0.005 | d' | 1 |
| 45 | Z' | 0.100 | 0.04 | 1.01 | Dy | 0.03 | 0.005 | d' | 1 |
| 46 | S' | 0.100 | 0.04 | 1.01 | Dy | 0.03 | 0.005 | d' | 1 |
| 47 | S' | 0.100 | 0.04 | 1.01 | Dy | 0.03 | 0.005 | d' | 2 |
| 48 | AA' | 0.100 | 0.05 | 1.025 | Y | 0.03 | 0.008 | b' | 4 |
| 49 | AB' | 0.100 | 0.04 | 1.02 | Gd | 0.03 | 0.005 | c' | 3 |
| 50 | AC' | 0.100 | 0.05 | 1.015 | Tb | 0.03 | 0.005 | c' | 2 |
| 51 | AD' | 0.100 | 0.04 | 1.01 | Ho | 0.03 | 0.005 | a' | 1 |
| 52 | AE' | 0.100 | 0.04 | 1.01 | Er | 0.03 | 0.005 | a' | 1 |
| 53 | AF' | 0.100 | 0.04 | 1.01 | Tb | 0.03 | 0.005 | d' | 1 |
| 54 | AG' | 0.100 | 0.05 | 1.005 | Y, Dy | 0.03 | 0.005 | d' | 1 |
| 55 | AH' | 0.040 | 0.04 | 1.01 | Dy | 0.03 | 0.005 | d' | 1 |
| 56 | X' | 0.080 | 0.04 | 1.015 | Dy | 0.03 | 0.005 | f' | 0.5 |
| 57* | S' | 0.100 | 0.04 | 1.01 | Dy | 0 | 0.005 | d' | 1 |
| 58* | S' | 0.100 | 0.04 | 1.01 | Dy | 0.03 | 0 | d' | 1 |

TABLE 14

| Sample No. | Firing temperature (° C.) | Grain size ratio R | Dielectric constant | Dielectric loss tan δ (%) | Rate of variation in electrostatic capacity DC 5 kV/mm (ΔC %) | Rate of variation in electrostatic capacity with temperature ΔC/C$_{20}$ (%) | Rate of variation in electrostatic capacity with temperature ΔC/C$_{25}$ (%) | Specific resistance ρ logρ (Ω · cm) | Breakdown voltage DC (kV/mm) | Average life (h) |
|---|---|---|---|---|---|---|---|---|---|---|
| 129* | 1300 | 1.01 | 3400 | 3.0 | −75 | −9.2 | −15.7 | 13.3 | 15 | 2 |
| 130* | 1250 | 1.01 | 1050 | 3.7 | −33 | −4.5 | −6.7 | 13.3 | 14 | 20 |
| 131* | 1250 | 1.01 | 2500 | 2.0 | −47 | −2.0 | −11.2 | 13.2 | 15 | 45 |
| 132* | 1250 | 1.01 | 1250 | 2.9 | −58 | −9.8 | −15.9 | 13.4 | 15 | 10 |
| 133* | 1250 | 1.28 | 2610 | 2.5 | −64 | −15.5 | −25.5 | 11.3 | 11 | 13 |
| 134* | 1350 | 1.02 | 1820 | 2.7 | −49 | −7.9 | −15.1 | 13.1 | 15 | 1 |
| 135* | 1250 | 1.01 | 1910 | 2.2 | −57 | −9.2 | −15.3 | 11.0 | 14 | 15 |
| 136* | 1250 | 1.01 | 1700 | 2.4 | −55 | −14.1 | −20.1 | 11.4 | 14 | 6 |
| 137* | 1250 | 1.01 | 2050 | 4.5 | −60 | −12.3 | −19.2 | 11.6 | 9 | Not measurable |
| 138* | 1250 | 1.01 | 1980 | 2.8 | −62 | −12.5 | −17.2 | 11.2 | 8 | Not measurable |
| 139* | 1350 | 1.02 | 2070 | 3.1 | −50 | −9.0 | −14.1 | 12.4 | 8 | 2 |
| 140* | 1350 | 1.02 | 1530 | 3.5 | −44 | −8.7 | −13.5 | 11.1 | 11 | Not measurable |
| 141* | 1350 | 1.02 | 1510 | 3.9 | −49 | −8.7 | −14.0 | 11.3 | 8 | Not measurable |
| 142* | 1200 | 1.01 | 1720 | 2.8 | −47 | −15.2 | −29.8 | 13.2 | 14 | 4 |
| 143* | 1250 | 1.01 | 1710 | 2.2 | −59 | −15.1 | −16.5 | 13.1 | 14 | 9 |
| 144 | 1250 | 1.02 | 2400 | 1.7 | −53 | −6.9 | −12.7 | 13.2 | 13 | 80 |
| 145 | 1150 | 1.00 | 1450 | 2.1 | −31 | −9.9 | −14.9 | 13.3 | 15 | 120 |
| 146 | 1250 | 0.85 | 1700 | 2.1 | −30 | −9.9 | −14.8 | 13.5 | 15 | 155 |
| 147 | 1250 | 1.25 | 3050 | 1.5 | −42 | −9.9 | −14.9 | 13.2 | 15 | 100 |
| 148 | 1175 | 1.01 | 1600 | 2.1 | −34 | −9.4 | −14.2 | 13.4 | 15 | 130 |
| 149 | 1200 | 1.01 | 1470 | 2.4 | −34 | −8.7 | −14.1 | 13.5 | 14 | 135 |
| 150 | 1200 | 1.01 | 1470 | 2.3 | −35 | −9.3 | −14.3 | 13.2 | 14 | 156 |
| 151 | 1200 | 1.01 | 1910 | 2.0 | −39 | −8.8 | −13.5 | 13.1 | 15 | 104 |
| 152 | 1250 | 1.01 | 2030 | 2.1 | −38 | −7.9 | −13.2 | 13.3 | 14 | 132 |
| 153 | 1250 | 1.01 | 1810 | 2.3 | −35 | −8.1 | −11.8 | 13.1 | 14 | 154 |
| 154 | 1250 | 1.01 | 1820 | 2.4 | −30 | −7.9 | −11.0 | 13.0 | 14 | 122 |
| 155 | 1200 | 1.01 | 2020 | 2.5 | −38 | −9.8 | −15.3 | 13.2 | 14 | 85 |
| 156 | 1250 | 1.01 | 1710 | 2.0 | −31 | −9.2 | −13.7 | 13.5 | 15 | 125 |
| 157* | 1225 | 5.50 | 2130 | 2.8 | −80 | +22.7 | +210.0 | 12.7 | 10 | 8 |
| 158* | 1225 | 1.02 | 2050 | 3.2 | −56 | −13.6 | −18.7 | 10.4 | 7 | Not measurable |

As described also in Example 3, the preferable composition of the dielectric ceramic according to the present invention is represented by $\{Ba_{1-x-y}Ca_xRE_yO\}_m TiO_2 + \alpha MgO + \beta MnO$, wherein $0.001 \leq \alpha \leq 0.05$; $0.001 \leq \beta \leq 0.025$; $1.000 < m \leq 1.035$; $0.02 \leq x \leq 0.15$; and $0.001 \leq y \leq 0.06$.

In Tables 13 and 14, samples marked with * fall outside the above-described preferable compositional range.

As is clear from Table 14, each of Sample Nos. 144 to 156, whose composition falls within the preferable compositional range, exhibits a rate of variation in electrostatic capacity with temperature that satisfies the B characteristics specified by JIS specifications within the temperature range of −25° C. to +85° C. and that satisfies the X8R characteristics specified by EIA specifications within the temperature range of −55° C. to +150° C. In addition, average sample life in the high temperature loading test is almost 100 hours, and the samples can be fired at firing temperature of 1250° C. or less. The reasons why the above-described preferable compositional range is limited to the above values will next be described.

When the content of added Ca represented by x is less than about 0.02, as in Sample No. 129, the variation in dielectric constant with voltage may be significant, and average life in the high temperature loading test may be short. When x is in excess of about 0.15, as in Sample No. 130, the relative dielectric constant may be low and tan δ may be high.

When the content of added RE represented by y is less than about 0.001, as in Sample No. 131, average life may be short; whereas when y is in excess of about 0.06, as in Sample No. 132 the temperature dependence of dielectric constant may fail to satisfy the B and X8R characteristics, and average life in the high temperature loading test may be short.

When the content of added MgO represented by α is less than about 0.001, as in Sample No. 133, the specific resistivity may be low due to grain growth during firing and the temperature dependence of dielectric constant may fail to satisfy the B and X8R characteristics; whereas when α is in excess of about 0.05, as in Sample No. 134, the sintering temperature may increase and life in the high temperature loading test may be short.

When the content of added MnO represented by β is less than about 0.001, as in Sample No. 135, the specific resistivity may be low; whereas when β is in excess of about 0.025, as in the case of Sample No. 136, the specific resistivity may be low and the temperature-dependence of dielectric constant may fail to satisfy the B and X8R characteristics.

When the ratio of (Ba, Ca, RE)/Ti represented by m is less than about 1.000, as in Sample 137, and when m is 1.000, as in sample No. 138, specific resistivity may also be low. Sample Nos. 137 and 138 may have a much shorter life in the high temperature loading test, and some samples were broken immediately upon application of voltage at high temperature. When the ratio of (Ba, Ca, RE)/Ti represented by m is in excess of about 1.035, as in Sample No. 139, sinterability may be poor and life in the high temperature loading test may be short.

When no sintering aid is added, as in Sample Nos. 140 and 141, sintering may be poor to cause large loss of specific resistivity due to plating and life in the high temperature loading test may be short; whereas when a sintering aid is added in an amount in excess of about 5.0 parts by weight, as in Sample No. 142, a secondary phase of a glass component contained in the sintering aid may increase to thereby shorten life in the high temperature loading test.

When the content of an alkali metal oxide serving as an impurity contained in $\{Ba_{1-x-y}Ca_xRE_yO\}TiO_2$ is in excess of about 0.03 wt. %, as in Sample No. 143, life in the high temperature loading test may be short.

When MgO is not present, as in Sample No. 157, the ratio R is as high as 5.5, showing remarkable grain growth, and variation in dielectric constant with temperature is disadvantageously large. When Mno is not present, as in Sample No. 158, specific resistivity is low and life is disadvantageously much shorter.

In Example 4, the dielectric ceramic layer has a thickness of 6 μm. When the average grain size is as relatively large as about 1.20 μm, as in Sample No. 144, variation in dielectric constant with temperature is small, but variation in dielectric constant with voltage is large, and life in the high temperature loading test may be short. In contrast, when the average grain size is as small as about 0.25 μm, as in Sample No. 145, the dielectric constant may be small and variation in dielectric constant with temperature may be large due to low electric field applied to the dielectric ceramic layer.

When the ratio of (average grain size of dielectric ceramic product)/(average particle size of provided starting material powder), which is represented by R, is as small as about 0.85, as in Sample No. 146, dielectric constant is lowered; whereas when the ratio R is as high as about 1.25, as in Sample No. 147, grain growth is induced during firing and the ceramic grains disposed between internal electrodes decrease in number when a dielectric layer is thinned, to possibly shorten life in a high temperature loading test.

In Sample Nos. 148 to 156, the dielectric constant falls within the range of 1470 to 2030 and the dielectric ceramic layer is relatively thick. In Example 4, variation of electrostatic capacity under high voltage is as low as less than 40%. No deterioration due to plating is observed. Sample life in the high temperature loading test is long, and the samples have excellent reliability. However, when a sample having an average particle size as in Sample Nos. 148 to 156 is applied to a laminated ceramic capacitor having a thickness of 2 μm or less as in Example 1, reliability thereof may be deteriorated.

As described hereinabove, the dielectric ceramic composition according to the present invention has excellent temperature-dielectric constant characteristics and excellent reliability, regardless of whether or not it has a core-shell structure. During production of a dielectric ceramic electronic composition by firing in a reducing atmosphere, the ceramic composition is not reduced. Therefore, the laminated ceramic electronic capacitor of the present invention formed by use of the dielectric ceramic composition allows use of a base metal such as nickel or a nickel alloy as the internal electrode material, to thereby lower costs of producing a laminated ceramic capacitor.

In the dielectric ceramic composition according to the present invention, the temperature dependence of the dielectric constant is made low based not on the core-shell structure, but based on intrinsic temperature characteristics of the ceramic composition. Therefore, the temperature characteristics and reliability are not affected by the state of dispersion of an additive component, to thereby lower the variation in characteristics with firing conditions. Since the laminated ceramic capacitor according to the present invention is produced by use of the dielectric ceramic composition, the capacitor shows small variation of characteristics and low temperature dependence of dielectric constant.

In the method for producing a laminated ceramic capacitor according to the present invention, when the average particle size of the compound represented by $\{Ba_{1-x}Ca_xO\}TiO_2$, preferably $\{Ba_{1-x-y}Ca_xRE_yO\}TiO_2$, is controlled to be as small as about 0.1 μm–0.3 μm, the laminated ceramic capacitor, even when having a dielectric ceramic layer having a thickness as thin as 3 μm or less, possesses a dielectric constant having low temperature dependence up to 125° C., and high reliability. In addition, the dielectric ceramic layer can be filled with a number of ceramic grains, to thereby enhance reliability thereof. Thus, small-scale thin laminated ceramic capacitors having high electrostatic capacity can advantageously be obtained.

When the average particle size of the compound represented by $\{Ba_{1-x}Ca_xO\}TiO_2$, preferably $\{Ba_{1-x-y}Ca_xRE_yO\}TiO_2$, is controlled to be more than about 0.3 μm and not more than about 0.8 μm, the laminated ceramic capacitor having a dielectric ceramic layer having a thickness of 3 μm or more possesses a dielectric constant having low temperature dependence up to a temperature of 150° C., and high reliability.

Also, in the method for producing a laminated ceramic capacitor according to the present invention, the content of alkali metal oxide in the compound represented by $\{Ba_{1-x}Ca_xO\}_mTiO_2$, preferably $\{Ba_{1-x-y}Ca_xRE_yO\}_mTiO_2$, contained as an impurity is controlled to about 0.03 wt. % or less, to thereby enhance reliability of the dielectric ceramic layer.

Into the dielectric ceramic composition or a ceramic layer of the laminated ceramic capacitor according to the present invention, a sintering aid, e.g., one predominantly comprising $SiO_2$, is incorporated in an amount of about 0.2–5.0 parts by weight based on 100 parts by weight of the remaining components of the dielectric ceramic composition. By addition of such a sintering aid, the dielectric ceramic can be easily sintered at a relatively low temperature such as 1250° C. or less in the firing step. Therefore, in the laminated ceramic capacitor, shrinkage of internal electrodes during the firing step decreases. Therefore, even when the laminated ceramic capacitor has a thin dielectric ceramic layer, reliability can be enhanced and materials containing a base metal such as nickel, copper, or an alloy thereof can be employed as the internal electrodes without any problem.

Also, in the method for producing a laminated ceramic capacitor according to the present invention, during sintering to obtain the dielectric ceramic composition, the ratio of (average grain size of dielectric ceramic product)/(average particle size of provided starting material powder), which is represented by R, is selected from within the range of about 0.90–1.2. When the ratio is within such a range, remarkable grain growth does not occur during sintering of the ceramic, and there can be obtained a dielectric ceramic having a dielectric constant of excellently low temperature dependence.

What is claimed is:

1. A laminated ceramic capacitor comprising:
   a laminate formed of a plurality of layers of the dielectric ceramic composition comprising a complex oxide containing Ba, Ca, Ti, Mg, and Mn as metal elements and not having a core-shell structure, and having side faces,
   a plurality of external electrodes provided at different positions on side faces of the laminate, and
   a plurality of internal electrodes accommodated in the laminate, each internal electrode being provided along an interface between two adjacent dielectric ceramic layers such that the internal electrode has one end exposed to one of the side faces so as to establish electric contact with one of the external electrodes.

2. A laminated ceramic capacitor according to claim 1, wherein the internal electrodes comprise Ni or Ni alloy.

3. A laminated ceramic capacitor according to claim 2, wherein the dielectric ceramic composition further comprises a sintering aid in an amount of about 0.2–5.0 parts by weight based on 100 parts by weight of the remaining components of the dielectric ceramic composition.

4. A laminated ceramic capacitor according to claim 2, wherein the dielectric ceramic composition is represented by $\{Ba_{1-x-y}Ca_xRE_yO\}_mTiO_2+\alpha MgO+\beta MnO$, wherein RE is a rare earth metal element, $0.001 \leq \alpha \leq 0.05$; $0.001 \leq \beta \leq 0.025$; $1.000 < m \leq 1.035$; $0.02 \leq x \leq 0.15$; and $y \leq 0.06$.

5. A laminated ceramic capacitor according to claim 4, wherein y is 0, and the dielectric ceramic composition further comprises a sintering aid in an amount of about 0.2–5.0 parts by weight based on 100 parts by weight of the remaining components of the dielectric ceramic composition.

6. A laminated ceramic capacitor according to claim 5, wherein the sintering aid comprises $SiO_2$ as its primary component.

7. A laminated ceramic capacitor according to claim 4, wherein y is at least 0.001, RE is at least one element selected from the group consisting of Y, Gd, Tb, Dy, Ho, Er and Yb, and the dielectric ceramic composition further comprises a sintering aid in an amount of about 0.2–5.0 parts by weight based on 100 parts by weight of the remaining components of the dielectric ceramic composition.

8. A laminated ceramic capacitor according to claim 7, wherein the sintering aid comprises $SiO_2$ as its primary component.

9. A method for producing a laminated ceramic capacitor comprising the following steps:

providing a mixture comprising a compound represented by $\{Ba_{1-x-y}Ca_xRE_yO\}_mTiO_2$ wherein RE is a rare earth metal element, $0.001 \leq \alpha \leq 0.05$; $0.001 \leq \beta \leq 0.025$; $1.000 < m \leq 1.035$; $0.02 \leq x \leq 0.15$; and $y \leq 0.06$., an Mg compound, and an Mn compound;

fabricating a laminate by laminating a plurality of ceramic green sheets containing said mixture and a plurality of internal electrodes each formed along a interface between two adjacent ceramic green sheets such that each of the internal electrodes has one end exposed at one side of said layers;

firing the laminate so as to sinter said mixture to thereby form a dielectric ceramic product not having a core-shell structure; and forming a plurality of external electrodes on each side face of the laminate such that the one end of each of the internal electrodes exposed to the side face is electrically contacted with one of the external electrodes.

10. A method for producing a laminated ceramic capacitor according to claim 9, wherein said titanate contains alkali metal oxide in an amount of 0.03 wt. % or less and has an average particle size of about 0.1–0.8 μm.

11. A method for producing a laminated ceramic capacitor according to claim 10, wherein said average particle size is between about 0.1 μm and 0.3 μm.

12. A method for producing a laminated ceramic capacitor according to claim 11, wherein said average particle size is greater than 0.3 μm and not greater than about 0.8 μm.

13. A method for producing a laminated ceramic capacitor according to claim 9, wherein y is 0, and the ceramic composition alkali metal content is less than 0.03 weight percent.

14. A method for producing a laminated ceramic capacitor according to claim 9, wherein y is at least 0.001, and the ceramic composition alkali metal content is less than 0.03 weight percent.

15. A method for producing a laminated ceramic capacitor according to claim 9, wherein the ratio (average grain size of dielectric ceramic product)/(average particle size of provided starting material powder) is between about 0.90 and 1.2.

16. A method for producing a laminated ceramic capacitor comprising the following steps:

providing a mixture forming a compex oxide containing Ba, Ca, Ti, Mg and Mn as metal elements;

fabricating a laminate by laminating a plurality of ceramic green sheets containing said mixture and a plurality of internal electrodes each formed along a interface between two adjacent ceramic green sheets such that each of the internal electrodes has one end exposed at one side of said layers;

firing the laminate so as to sinter said mixture to thereby form a dielectric ceramic product not having a core-shell structure; and forming a plurality of external electrodes on each side face of the laminate such that the one end of each of the internal electrodes exposed to the side face is electrically contacted with one of the external electrodes.

17. A laminated capacitor according to claim 4, wherein x is at least 0.05.

18. A method for producing a laminated capacitor according to claims 9, wherein x is at least 0.05.

* * * * *